US008392627B2

(12) United States Patent
Eilebrecht (10) Patent No.: US 8,392,627 B2
(45) Date of Patent: Mar. 5, 2013

(54) ADAPTIVE SEMAPHORE

(75) Inventor: Eric L. Eilebrecht, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/092,981

(22) Filed: Apr. 25, 2011

(65) Prior Publication Data

US 2012/0271972 A1   Oct. 25, 2012

(51) Int. Cl.
*G06F 3/00* (2006.01)
*G06F 17/00* (2006.01)

(52) U.S. Cl. ............................................. 710/18; 706/48
(58) Field of Classification Search .................... 710/18; 706/48

See application file for complete search history.

(56) References Cited

U.S. PATENT DOCUMENTS

| | | | |
|---|---|---|---|
| 6,237,019 B1 * | 5/2001 | Ault et al. ..................... | 718/104 |
| 6,857,025 B1 * | 2/2005 | Maruyama et al. ............ | 709/235 |
| 7,765,351 B2 | 7/2010 | Nsame et al. | |
| 7,805,436 B2 | 9/2010 | Richards et al. | |
| 2003/0188278 A1 * | 10/2003 | Carrie .............................. | 716/4 |
| 2005/0262507 A1 | 11/2005 | Langen et al. | |
| 2008/0154837 A1 * | 6/2008 | Morimura et al. .............. | 706/48 |
| 2010/0083272 A1 | 4/2010 | Hellerstein et al. | |
| 2010/0325070 A1 | 12/2010 | Eilebrecht et al. | |

OTHER PUBLICATIONS

SCO OpenServer Relase 5.0.7—Configuring kernel parameters, Feb. 11, 2003, Caldera International, Inc.*
Fuentes, Erika, "Throttling Concurrency in the CLR 4.0 ThreadPool", Retrieved at <<http://msdn.microsoft.com/en-us/magazine/ff960958.aspx>>, Sep. 2010, pp. 11.
Foley, Chris, "Dynamic Bandwidth Throttling", Retrieved at <<http://www.atcusa.com/whitepapers/Afaria/BandwidthThrottling.pdf>>, 2002, pp. 11.
"Class Semaphore", Retrieved at <<http://download.oracle.com/javase/1.5.0/docs/api/java/util/concurrent/Semaphore.html>>, Retrieved Date: Mar. 7, 2011, pp. 13.
"Synchronization mechanisms", Retrieved at <<http://www.boost.org/doc/libs/1_44_0/doc/html/interprocess/synchronization_mechanisms.html>>, Retrieved Date: Mar. 4, 2011, pp. 40.
"Suggestions for Using Execution Systems and Priorities", Retrieved at <<http://zone.ni.com/reference/en-XX/help/371361G-01/lvconcepts/suggestions_for_exec/>>, Jun. 2010, pp. 5.
"Semaphore (programming)", Retrieved at <<http://en.wikipedia.org/wiki/Semaphore_(programming)>>, Retrieved Date: Mar. 25, 2011, p. 5.

* cited by examiner

*Primary Examiner* — Hyun Nam (57) ABSTRACT

Aspects of the subject matter described herein relate to semaphores. In aspects, a feedback mechanism is described that uses a semaphore to attempt to maximize throughput of a computer system. Throughput is tracked over periods of time. At or after the end of a period of time, the throughput of the period of time together with other data is used to determine whether a max count for a semaphore is to be changed and by how much. This monitoring of throughput and modifying of the max count may continue over subsequent periods of time to attempt to maximize throughput.

20 Claims, 4 Drawing Sheets

ADAPTIVE SEMAPHORE

BACKGROUND

A semaphore provides a logical mechanism by which access to a shared resource may be controlled. When a process seeks to gain access to a shared resource, the process may first check to see if a semaphore currently allows the use of the shared resource. The semaphore may keep a count that indicates the number of units of the shared resource that are available. If the count is greater than zero, it indicates that at least one unit of the shared resource is available.

A process may need a number of resources to complete certain work. If the semaphore indicates that a sufficient number of units of the resource are available for use by the process, the count associated with the semaphore may be decremented by the number of units the process needs. After the process is finished with the resource, the process may release the units and the semaphore may be incremented by the number of units released.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to semaphores. In aspects, a feedback mechanism is described that uses a semaphore to attempt to maximize throughput of a computer system. Throughput is tracked over periods of time. At or after the end of a period of time, the throughput of the period of time together with other data is used to determine whether a max count for a semaphore is to be changed and by how much. This monitoring of throughput and modifying of the max count may continue over subsequent periods of time to attempt to maximize throughput.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
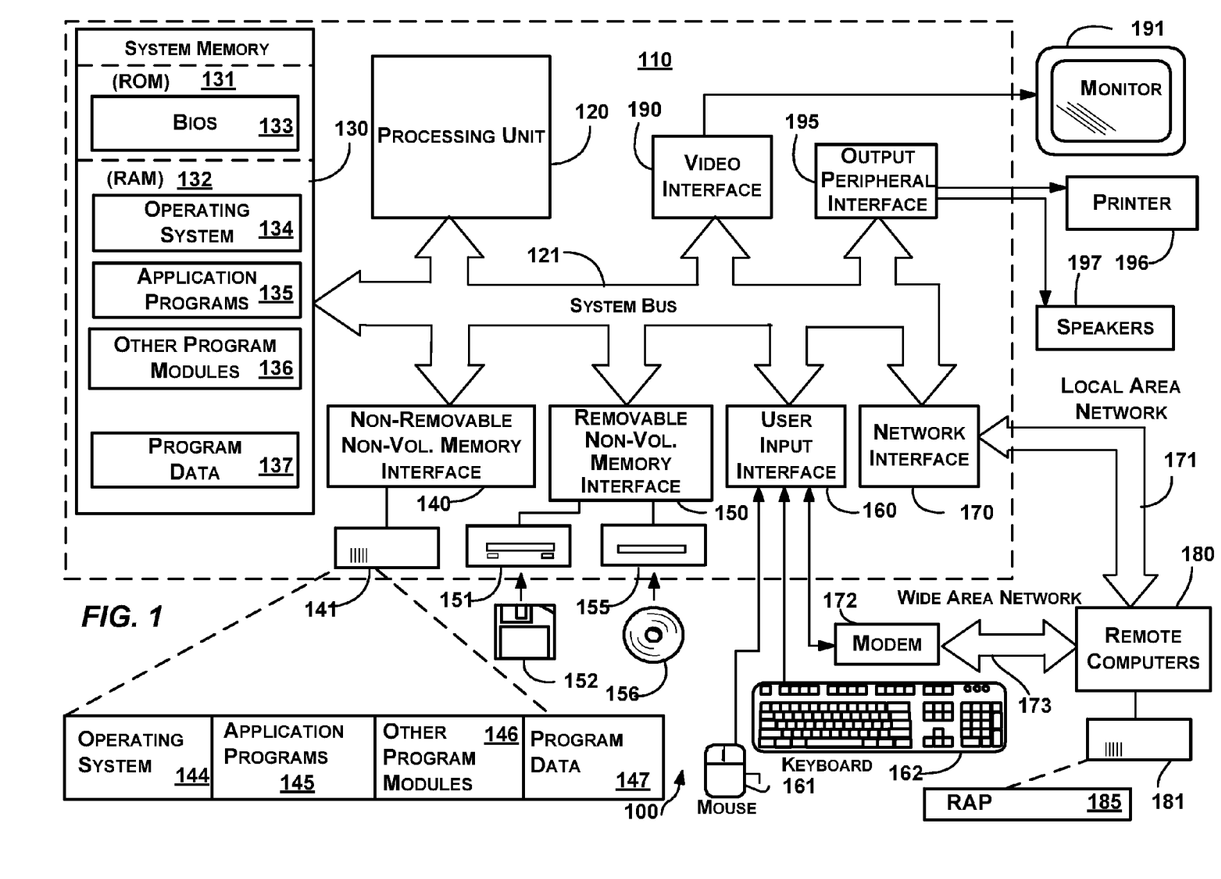
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Semaphores

Figure 2:
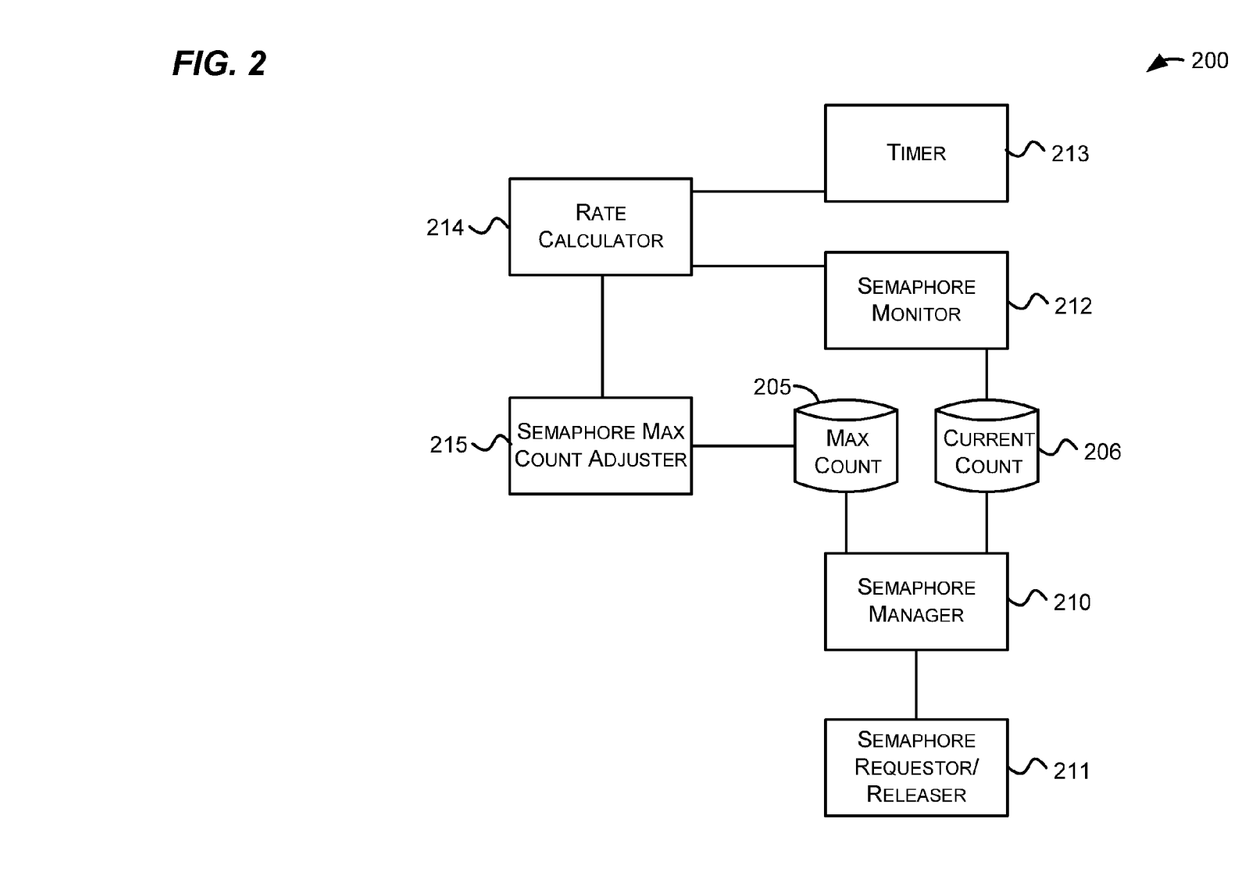
FIG. 2 is a block diagram that generally represents a system configured in accordance with aspects of the subject matter described herein.

As mentioned previously, a semaphore may be used as a logical mechanism by which access to a shared resource may be controlled. FIG. 2 is a block diagram that generally represents a system configured in accordance with aspects of the subject matter described herein. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

Turning to FIG. 2, the system 200 may include stores 205 and 206, a semaphore manager 210, a semaphore requestor/releaser 211, a semaphore monitor 212, a timer 213, a rate calculator 214, a semaphore max count adjuster 215, and other components (now shown). The semaphore manager 210, semaphore requestor/releaser 211, semaphore monitor 212, timer 213, rate calculator 214, and semaphore max count adjuster 215 are sometimes referred to individually as a component or in groups of two or more as components. As used herein, the term component is to be read to include hardware such as all or a portion of a device, a collection of one or more software modules or portions thereof, some combination of one or more software modules or portions thereof and one or more devices or portions thereof, and the like.

The system may include one or more computing devices that host the components. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured host the components of the system 200 comprises the computer 110 of FIG. 1.

The various components may be located relatively close to each other or may be distributed across the world. The various components may communicate with each other via various networks including intra- and inter-office networks.

The stores 205-206 store data relevant to a semaphore. The stores 205-206 may be implemented with a file system, database, volatile memory such as RAM, other storage, some combination of the above, and the like and may be distributed across multiple devices. The stores 205-206 may be external, internal, or include components that are both internal and external to an apparatus of the system 200. In one embodiment, there may be a single store that includes the data of the stores 205-206.

For data, the store 205 may store a maximum value of a semaphore. This value represents the maximum number of units that may be used at the same time and is sometimes referred to as "max count". The store 206 may store a value that represents the current available number of units associated with the semaphore. This current available number is sometimes referred to as current count.

For example, the maximum value may represent a number of concurrent operations that are allowed to exist on a computer system. In one embodiment, the number of concurrent operations may correspond to a number of threads that are able to execute at the same time. In another embodiment, the number of concurrent operations may correspond to a number of database operations, Web requests, CPU operations, calculations, memory accesses, disk accesses, network operations, or the like. Concurrent operations may indicate operations that overlap each other during at least a portion of each of the operations.

In the example above, the store 206 may store a value that represents the current remaining number of operations that may be executed concurrently without exceeding the maximum value. For example, if the maximum value is 10, a current value of 10 indicates that no operations are currently executing concurrently and that 10 operations may execute concurrently without exceeding the maximum value. A current value of 5, on the other hand, may represent that 5 operations are executing concurrently and that 5 more operations may also execute concurrently without exceeding the maximum value.

A process (e.g., the semaphore requestor/releaser 211) seeking to use one or more units associated with the semaphore may first make a request to the semaphore manager 210 before attempting to perform the one or more operations.

In response to acquire and release requests, the semaphore manager 210 may be operable to adjust a current count of the semaphore. For example, for an acquire request from a process, the semaphore manager 210 may retrieve the current value from the store 206. If the current value is greater than or equal to the number of units sought by the process, the semaphore manager 210 may decrement the current value by the number of units requested. If the current value is not greater than or equal to the number of units sought by the process, in one embodiment, the process may sleep, data for the process may be added to a queue that represents processes waiting for units, and the process may be awoken when the process comes to the beginning of the queue and the units are available.

In another embodiment, when there are not sufficient units, the process may be informed that sufficient units are not available, and the process may take appropriate actions (e.g., wait for units to become available, terminate, throw an exception, take other actions, and the like).

When the semaphore requestor/releaser 211 is done using the units allocated by the semaphore manager 210, the semaphore requestor/releaser 211 may send a message to the semaphore manager 210 to release the units. In response, the semaphore manager 210 may increase the current count by the number of units released. In this manner, the semaphore manager 210 may control activities associated with the semaphore to ensure that the maximum count of units used by those activities is not exceeded.

The examples described above of how a semaphore may be used are not intended to be exhaustive or all-inclusive. Based on the teachings herein, those skilled in the art may recognize other applications for semaphores that may be employed without departing from the spirit or scope of aspects of the subject matter described herein.

The other components 212-215 may be used to monitor semaphore usage and adjust the maximum value based on the usage. For example, the semaphore monitor 212 may watch the current count 206 and thereby track a number of semaphore operations (acquires or releases) that have occurred during a period of time. In one embodiment, the semaphore monitor 212 may accumulate just a sum of the number of acquires, where an acquire that acquires multiple units causes the sum to increase by the number of acquired units. In another embodiment, the semaphore monitor 212 may accumulate just a sum of releases, where a release that releases multiple units may cause the sum to increase by the number of released units. In yet another embodiment, the semaphore monitor 212 may accumulate a sum of acquires and a sum of releases.

Upon request, the semaphore monitor 212 may provide a sum to a requestor. The requestor (e.g., the rate calculator 214) may use the sum together with time information from the timer 213 to determine a rate of acquiring/releasing units. For example, the rate calculator 214 may use two times from the timer to calculate a period of time (e.g., X seconds, where X can be less than 1, greater than 1 or equal to 1). The rate calculator 214 may divide the sum by the period of time to get a rate.

For example, if the period is 1 second and the sum is 1000 and corresponds to releases, the rate equals 1000 releases per second. Likewise, if the period is 0.5 seconds and the sum is 250 and corresponds to releases, the rate equals 500 releases per second or 250 releases per half second.

The rate may correspond to throughput of a computer system. For example, if the semaphore controls access to concurrent operations, the rate represents the number of concurrent operations that occurred during the period of time. These concurrent operations that occurred during the period of time correspond to throughput of the computer system with a larger rate representing more throughput and a smaller rate representing less throughput. In this example, the current maximum value for the semaphore may indicate a current maximum concurrency level of operations (e.g., a maximum number of concurrent operations) for a computer system.

After or upon a request for a sum from the semaphore monitor 212, the semaphore monitor may reset the sum to zero and begin accumulating releases/acquires in the sum as appropriate.

The semaphore max count adjuster 215 (hereinafter sometimes referred to as the semaphore adjuster 215) may be operable to modify a current maximum value of a semaphore based on the first throughput and a second throughput of the system, where the throughputs are indicated by the rates provided by the rate calculator 214. At least three cases exist:

1. If the throughput in a previous period is greater than the throughput in the current period and the max count was increased prior to the current period, the semaphore adjuster 215 may determine that the increase of the max count caused the throughput to decrease. In response, the semaphore adjuster 215 may decrease the max count. If the max count was decreased prior to the current period, the semaphore adjuster 215 may determine that the decrease of the max count caused the throughput to decrease. In response, the semaphore adjuster 215 may increase the max count.

2. If the throughput in a previous period is less than the throughput in the current period and the max count was increased prior to the current period, the semaphore adjuster 215 may determine that the increase of the max count caused the throughput to increase. Increasing the max count again may cause throughput to increase again, so the semaphore adjuster 215 may increase the max count. If the max count was decreased prior to the current period, the semaphore adjuster 215 may determine that the decrease of the max count caused the throughput to increase. In response, the semaphore adjuster 215 may decrease the max count again.

3. If the throughput in the previous period is equal to the throughput in the current period and the max count change prior to the current period, the semaphore adjuster 215 may not have a hint as to what effect on throughput increasing or decreasing the max count will have. In this case, the semaphore adjuster 215 may repeat a previous action (e.g., increase or decrease the max count), randomly select to increase or decrease the max count, or take other actions with the hope that at the end of the next period throughput data will indicate whether this change helped or hurt throughput.

In adjusting the max count, the semaphore adjuster 215 may also adjust the current count to account for the change in max count. For example, if the max count is increased by 5 the current count may also be increased by 5. Likewise, if the max count is decreased by 5, the current count may also be decreased by 5. If the current count cannot be less than zero, the semaphore manager 210 may be informed so that it may correct the current count when it can do so without making it less than zero (e.g., when releases are received).

The semaphore adjuster 215 may store one or more previous throughput values so as to be able to determine the effect of changing the max count on throughput over time.

Figure 3:
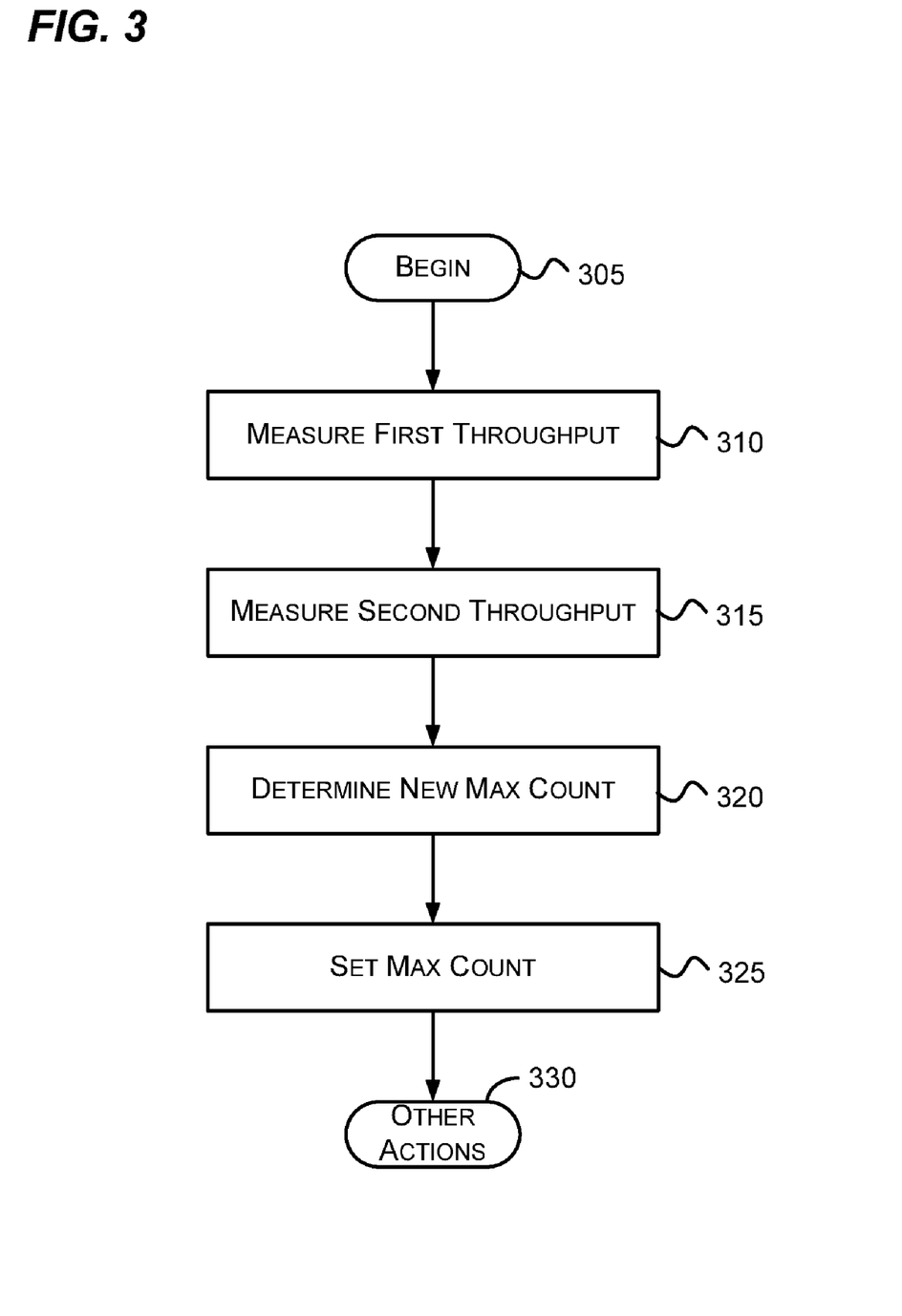
FIGS. 3-4 are flow diagrams that generally represent exemplary actions that may occur in accordance with aspects of the subject matter described herein.
Figure 4:
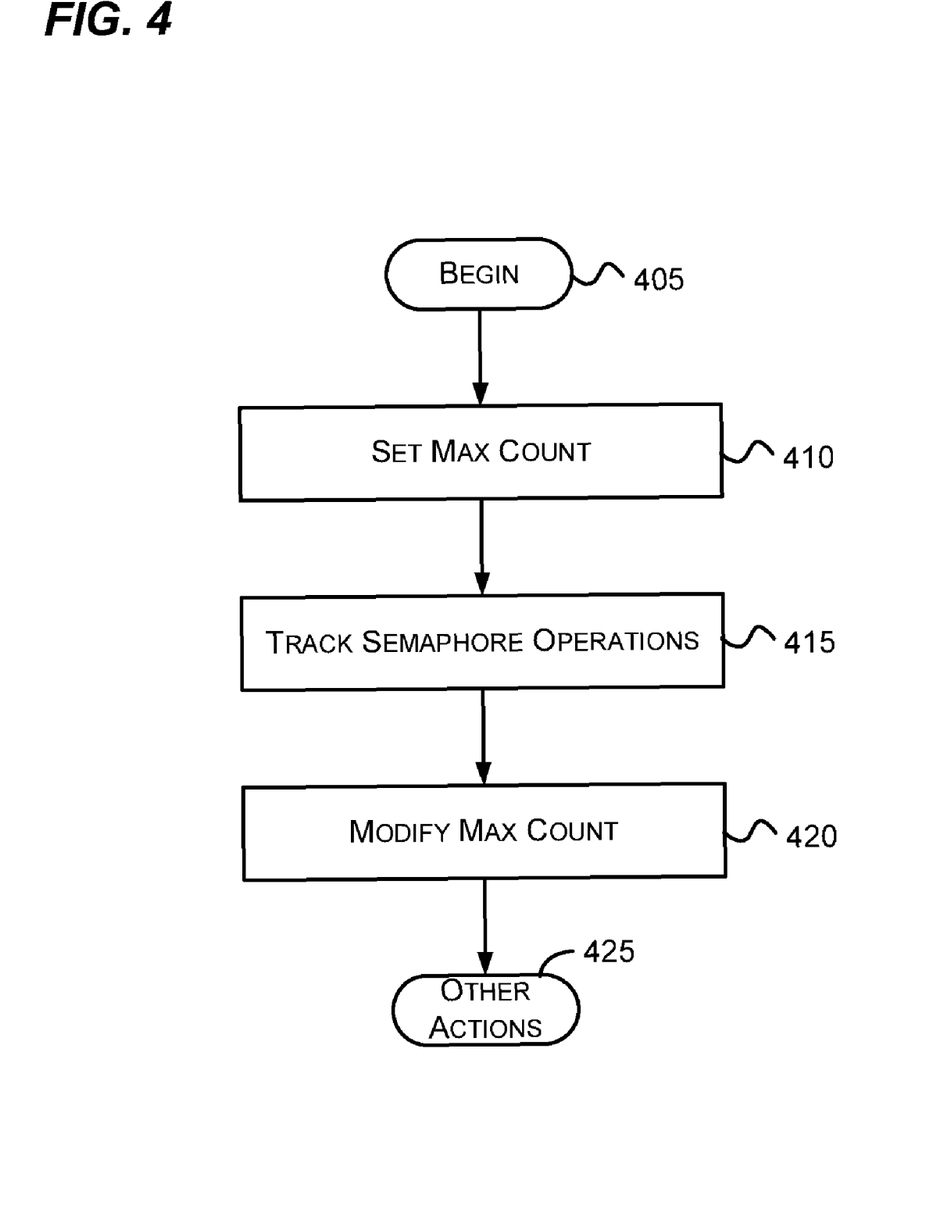

FIGS. 3-4 are flow diagrams that generally represent exemplary actions that may occur in accordance with aspects of the subject matter described herein. For simplicity of explanation, the methodology described in conjunction with FIGS. 3-4 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 3, at block 305, the actions begin. At block 310, throughput is measured for a first time period. For example, referring to FIG. 2, the rate calculator 214 may use data (e.g., sum data and time data) from the semaphore monitor 212 and the timer 213 to determine throughput during a first period of time. Measuring throughput may include tracking a rate of semaphore operations (e.g., release or acquire) associated with the semaphore over the time period. Tracking a rate of semaphore operations may include maintaining a value that indicates the number of semaphore operations that occurred during a time period, and dividing the value by the time period to determine the rate of the semaphore operations.

At block 315, a throughput is measured over a second time period. For example, referring to FIG. 2, the rate calculator 214 may use data from the semaphore monitor 212 and the timer 213 to determine throughput during a second period of time.

During the first and second time periods, the workload may potentially change dramatically or slightly. For an example of a dramatic change, a server that is acting as a database server may begin acting as a Web server or an application server. As an example of a less dramatic change, the server may have slightly more or less requests for the same type of data the server has been providing.

At block 320, a new max value for the semaphore may be determined based on the first and second throughputs. For example, referring to FIG. 2, the semaphore adjuster 215 may increase the current maximum value if the current maximum value (e.g., current max count) is greater than the previous maximum value (e.g., the max count for the just prior time period) and the second throughput is greater than the first throughput. As another example, the semaphore adjuster 215 may decrease the current maximum value if the current maximum value is greater than the previous maximum value and the second throughput is less than the first throughput.

As yet another example, the semaphore adjuster 215 may determine a new maximum value that is different (e.g., greater than or less than) the current maximum value if the first throughput is equal to the second throughput regardless of whether the current maximum value is greater than, equal to, or less than the previous maximum value. The amount of the increase or decrease may be random, according to configuration, or otherwise, without departing from the spirit or scope of aspects of the subject matter described herein.

In each of the examples above, the increase or decrease of the current maximum value is not limited to an increase or decrease by one. Indeed, the increase or decrease may be set by configuration data, may be a function of the previous throughputs, time periods, or other parameters without departing from the spirit or scope of aspects of the subject matter described herein.

At block 325 the current maximum value for the semaphore is set to the new maximum value. For example, referring to FIG. 2, the semaphore adjuster 215 may set the max count to a new max count.

At block 330, other actions, if any, may be performed. The other actions may include, for example, storing in a data structure a first value indicative of whether the current maximum value for the semaphore is greater than, less than, or equal to a previous maximum value for the semaphore. In one embodiment, this may involve just storing one or more of the previous maximum values. In another embodiment, this may involve storing a value that represents the comparison between the current and previous values.

Turning to FIG. 4, at block 405, the actions begin. At block 410, a current maximum value of a semaphore is set. For example, when a computer system starts up, the max count may be set to a maximum value previously set during a previous execution of the computer system. As another example, the max count may be set to a value associated (e.g., via a table or other data structure) with the anticipated workload (e.g., database server, Web server, application server, file server, or the like) of the computer system. For example, referring to FIG. 2, the semaphore adjuster 215 may set the max count to 10.

At block 415, the number of semaphore operations (e.g., acquire or release) are tracked over a period of time. For example, referring to FIG. 2, the semaphore monitor 212 tracks semaphore operations that affect the current count. For example, if the semaphore monitor 212 is tracking releases, the semaphore monitor 212 may update a sum that indicates how many units of releases have occurred. The timer 213 may be used to determine the period of time.

At block 420, based on the number of semaphore operations and the period of time, the maximum value of the semaphore is modified to attempt to increase throughput of the computer system. For example, referring to FIG. 2, the semaphore adjuster 215 may modify the max count based on rate information supplied by the rate calculator 214. The semaphore adjuster 215 may also use previous rate information in determining how to modify the max count. For example, if the throughput has increased and the previous max count was 5, the semaphore adjuster 215 may adjust the max count to 15.

At block 425, other actions, if any, may be performed.

While some of the disclosure above has referred to throughput, the teachings herein may also be applied to other uses of semaphores without departing from the spirit or scope of aspects of the subject matter described herein.

As can be seen from the foregoing detailed description, aspects have been described related to semaphores. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    using a processing unit, measuring a first throughput of a computer system over a first time period, the first throughput is a number of concurrent operations that occurred during the first time period;
    using the processing unit, measuring a second throughput of the computer system over a second time period, the second throughput is a number of concurrent operations that occurred during the second time period;
    using the processing unit, determining a new maximum value for a semaphore based on the first and second throughputs, wherein determining the new maximum value for the semaphore comprises:
        determining the new maximum value that is greater than a current maximum value if the first value indicates that the current maximum value is greater than a previous maximum value and the second throughput is greater than the first throughput;
        determining the new maximum value that is less than the current maximum value if the first value indicates that the current maximum value is greater than the previous maximum value and the second throughput is less than the first throughput;
        determining the new maximum value that is different than the current maximum value if the first throughput is equal to the second throughput regardless of whether the first value indicates that the current maximum value is greater than, equal to, or less than the previous maximum value; and
    setting the current maximum value for the semaphore to the new maximum value.

2. The method of claim 1, wherein measuring a second throughput of the computer system comprises tracking a rate of release operations of the semaphore over the second time period.

3. The method of claim 2, wherein tracking a rate of release operations of the semaphore comprises maintaining a first value that indicates the number of release operations that occurred during the second time period, and dividing the first value by the second time period to determine the rate of the release operations.

4. The method of claim 1, wherein measuring a second throughput of the computer system comprises tracking a rate of acquire operations of the semaphore.

5. The method of claim 1, further comprising storing in a data structure a first value indicative of whether the current maximum value for the semaphore is greater than, less than, or equal to a previous maximum value for the semaphore.

6. The method of claim 1, wherein setting a current maximum value for the semaphore comprises setting a value that indicates a current maximum concurrency level of operations for the computer system.

7. The method of claim 1 wherein measuring the first throughput of a computer system over a first time period comprises measuring the first throughput of a computer system during a workload that potentially changes over the first time period.

8. A computer storage memory having computer-executable instructions, which when executed perform actions, comprising:

measuring a first throughput of a computer system over a first time period, the first throughput is a number of concurrent operations that occurred during the first time period;

measuring a second throughput of the computer system over a second time period, the second throughput is a number of concurrent operations that occurred during the second time period;

determining a new maximum value for a semaphore based on the first and second throughputs, wherein determining the new maximum value for the semaphore comprises:

determining the new maximum value that is greater than a current maximum value if the first value indicates that the current maximum value is greater than a previous maximum value and the second throughput is greater than the first throughput;

determining the new maximum value that is less than the current maximum value if the first value indicates that the current maximum value is greater than the previous maximum value and the second throughput is less than the first throughput;

determining the new maximum value that is different than the current maximum value if the first throughput is equal to the second throughput regardless of whether the first value indicates that the current maximum value is greater than, equal to, or less than the previous maximum value; and setting the current maximum value for the semaphore to the new maximum value.

9. A computer, comprising:

a processing unit coupled to a memory, the memory comprising:

a timer operable to indicate a beginning and ending of a period of time;

a semaphore monitor operable to track a number of semaphore operations that occur during the period of time;

a rate calculator operable to measure a first throughput of the computer over a first time period, the first throughput is a number of concurrent operations that occurred during the first time period, and, measure a second throughput of the computer over a second time period, the second throughput is a number of concurrent operations that occurred during the second time period; and a semaphore adjuster operable to modify a current maximum value of a semaphore using feedback based on the first throughput of the system and the second throughput of the system, wherein modifying the current maximum value of the feedback comprises:

determining a new maximum value that is greater than the current maximum value if the first value indicates that the current maximum value is greater than a previous maximum value and the second throughput is greater than the first throughput;

determining the new maximum value that is less than the current maximum value if the first value indicates that the current maximum value is greater than the previous maximum value and the second throughput is less than the first throughput;

determining the new maximum value that is different than the current maximum value if the first throughput is equal to the second throughput regardless of whether the first value indicates that the current maximum value is greater than, equal to, or less than the previous maximum value; and setting the current maximum value for the semaphore to the new maximum value.

10. The method of claim 1, wherein determining the new maximum value that is different than the current maximum value if the first throughput is equal to the second throughput comprises increasing the new maximum value to a value greater than the current maximum value.

11. The method of claim 1, wherein determining the new maximum value that is different than the current maximum value if the first throughput is equal to the second throughput comprises increasing the new maximum value to a value less than the current maximum value.

12. The method of claim 1, wherein determining the new maximum value that is different than the current maximum value if the first throughput is equal to the second throughput comprises increasing the new maximum value to a random value.

13. The computer storage memory of claim 8, wherein measuring a second throughput of the computer system comprises tracking a rate of release operations of the semaphore over the second time period.

14. The computer storage memory of claim 13, wherein tracking a rate of release operations of the semaphore comprises maintaining a first value that indicates the number of release operations that occurred during the second time period, and dividing the first value by the second time period to determine the rate of the release operations.

15. The computer storage memory of claim 8, wherein measuring a second throughput of the computer system comprises tracking a rate of acquire operations of the semaphore.

16. The computer storage memory of claim 8, further comprising storing in a data structure a first value indicative of whether the current maximum value for the semaphore is greater than, less than, or equal to a previous maximum value for the semaphore.

17. The computer storage memory of claim 8, wherein setting a current maximum value for the semaphore comprises setting a value that indicates a current maximum concurrency level of operations for the computer system.

18. The computer storage memory of claim 8, wherein measuring the first throughput of a computer system over a first time period comprises measuring the first throughput of a computer system during a workload that potentially changes over the first time period.

19. The computer storage memory of claim 8, wherein determining the new maximum value that is different than the current maximum value if the first throughput is equal to the second throughput comprises increasing the new maximum value to a value greater than the current maximum value.

20. The computer storage memory of claim 8, wherein determining the new maximum value that is different than the current maximum value if the first throughput is equal to the second throughput comprises increasing the new maximum value to a value less than the current maximum value.

\* \* \* \* \*